US008130924B2

(12) United States Patent
Rossi et al.

(10) Patent No.: US 8,130,924 B2
(45) Date of Patent: *Mar. 6, 2012

(54) METHODS AND APPARATUS FOR PROCESSING AND DISPLAY OF VOICE DATA

(75) Inventors: Joseph A. Rossi, Bellingham, MA (US); Gaetane A. Scouras, Webster, MA (US)

(73) Assignee: Computer Associates Think, Inc., Islandia, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/720,471

(22) Filed: Mar. 9, 2010

(65) Prior Publication Data
US 2010/0169083 A1 Jul. 1, 2010

Related U.S. Application Data

(63) Continuation of application No. 11/097,114, filed on Apr. 1, 2005, now Pat. No. 7,693,268.

(60) Provisional application No. 60/558,912, filed on Apr. 2, 2004, provisional application No. 60/602,702, filed on Aug. 17, 2004.

(51) Int. Cl.
*H04M 15/00* (2006.01)

(52) U.S. Cl. ............ 379/112.06; 379/88.22; 379/133; 379/139; 379/201.12; 379/221.08; 707/602; 707/603; 707/722; 707/736; 707/754; 709/201; 709/217; 709/218; 709/219; 709/246; 715/714; 715/748; 719/316; 719/328; 719/330

(58) Field of Classification Search ............ 340/3.1, 340/3.2, 825.26, 825.27; 370/351–356; 379/1.01–32.01, 88.13, 88.17, 88.18, 88.22, 379/111, 112.01, 112.06, 133, 139, 201.01, 201.12, 221.08, 265.03, 265.06; 707/602–604, 722, 736, 754–756; 709/201–203, 217–219, 230–232, 246–247; 715/700, 714, 717, 748; 719/313–316, 318–320, 328, 330

See application file for complete search history.

(56) References Cited

U.S. PATENT DOCUMENTS

| | | | | |
|---|---|---|---|---|
| 5,948,059 | A * | 9/1999 | Woo et al. ............ | 709/206 |
| 5,956,024 | A | 9/1999 | Strickland et al. ........... | 345/327 |
| 6,032,147 | A * | 2/2000 | Williams et al. .................. | 1/1 |
| 6,292,909 | B1 | 9/2001 | Hare ............................ | 714/40 |
| 6,490,620 | B1 | 12/2002 | Ditmer et al. ................ | 709/224 |
| 6,772,417 | B1 * | 8/2004 | Ko ................................ | 719/313 |
| 6,792,431 | B2 * | 9/2004 | Tamboli et al. .................. | 1/1 |
| 6,895,438 | B1 | 5/2005 | Ulrich ......................... | 709/227 |
| 6,947,984 | B2 * | 9/2005 | Schweitzer et al. ......... | 709/224 |
| 7,225,249 | B1 | 5/2007 | Barry et al. .................. | 709/224 |
| 7,299,240 | B1 * | 11/2007 | Crozier .............................. | 1/1 |
| 7,376,139 | B1 | 5/2008 | McDonald et al. .......... | 370/410 |
| 7,379,535 | B2 | 5/2008 | Cline et al. .................. | 379/1.02 |

(Continued)

*Primary Examiner* — Hemant Patel
(74) *Attorney, Agent, or Firm* — Pillsbury Winthrop Shaw Pittman LLP (57) ABSTRACT

Apparatus and methods for creating a composite data source having a common data representation from disparate sources of voice data. Data transmission links are established to heterogeneous messaging data sources, requests for voice data is sent using data access protocols, the voice data is received, and a set of voice data transformation rules are selectively applied to the voice data to transform the data into a common data representation. The common data representation can also be used as a source for reporting and graphical displays to monitor the operational aspects of the sources of voice data.

20 Claims, 6 Drawing Sheets

U.S. PATENT DOCUMENTS

| | | | |
|---|---|---|---|
| 7,453,871 B2 * | 11/2008 | Josyula et al. | 370/386 |
| 7,693,268 B2 * | 4/2010 | Rossi et al. | 379/112.06 |
| 2002/0091829 A1 | 7/2002 | Wood et al. | 709/227 |
| 2002/0152303 A1 | 10/2002 | Dispensa | 709/224 |
| 2003/0065776 A1 | 4/2003 | Malik et al. | 709/225 |
| 2003/0068028 A1 | 4/2003 | Cha | 379/200 |
| 2003/0133552 A1 | 7/2003 | Pillai et al. | 379/114.2 |
| 2003/0135593 A1 * | 7/2003 | Lee et al. | 709/223 |
| 2003/0149743 A1 * | 8/2003 | Baluja et al. | 709/217 |
| 2004/0252679 A1 | 12/2004 | Williams et al. | 370/356 |
| 2005/0021662 A1 | 1/2005 | Cline et al. | 709/217 |
| 2005/0276394 A1 | 12/2005 | Rossi et al. | 379/88.17 |
| 2007/0207785 A1 | 9/2007 | Chatterjee et al. | 455/414.1 |

* cited by examiner

METHODS AND APPARATUS FOR PROCESSING AND DISPLAY OF VOICE DATA

CROSS-REFERENCE TO RELATED APPLICATIONS

This application is a continuation of U.S. patent application Ser. No. 11/097,114 (now U.S. Pat. No. 7,693,268), filed Apr. 1, 2005, which claims priority to U.S. provisional patent application Ser. No. 60/558,912, filed Apr. 2, 2004 and U.S. provisional patent application Ser. No. 60/602,702, filed Aug. 17, 2004, the contents of each of which are hereby incorporated herein in their entirety.

FIELD OF THE INVENTION

The present invention relates generally to information processing and display, and, more particularly, to the automated processing and display of data associated with voice messaging.

BACKGROUND OF THE INVENTION

Telecommunication networks have become increasingly useful as network speed, reliability, and methods of delivery have increased. Generally, telecommunications and voice networks consist of network equipment (including computers, PBX's, voice messaging systems, routers, switches, hubs and servers), the media that connects the equipment (like cable, fiber, or a radio frequency signal), and the application programs or services provided by the network equipment. Data that is stored on any particular piece of network equipment may be accessible to any other piece of network equipment connected to the storing network equipment. In this way, telecommunications and voice networks may allow users and applications to interact over large or small geographical distances by sharing information.

Typically a voice network will include several pieces of equipment for handling voice calls, voice messaging, such as message application servers and/or message storage servers that handle voice mail, communication servers that provide voice over IP, caller applications, traffic routing, paging, facsimile, and other voice services. Each piece of equipment may come from a different vendor, and may potentially have unique storage and formatting standards for the data they generate and record.

Hence, there is a need for methods and apparatus to organize and present large amounts of substantially real-time operating information about voice and messaging equipment in a user-friendly and flexible way. The need is even more pressing with respect to communications networks that employ different messaging formats and use equipment from a variety of vendors to store, process, and deliver the various formats.

SUMMARY OF THE INVENTION

The present invention is directed to methods and systems for retrieving, processing and displaying information from various pieces of equipment in a voice data network using a common data representation. The information is converted from raw, binary format into a logical record format, and then transformed into "buckets" of information that can be correlated across different types of equipment and different messaging formats. The resulting data can then presented in a display or for viewing by a user.

In one aspect, the present invention provides a method for creating a composite data source having a common data representation from disparate sources of voice data. One or more data transmission links are established to multiple heterogeneous messaging data sources, and a request for voice data is sent to each source using at least one data access protocol. The voice data is received, and a set of voice data transformation rules are retrieved and selectively applied to the voice data to transform the received data into a common data representation of the heterogeneous messaging data sources.

In one embodiment, the heterogeneous messaging data sources include message application servers and/or message storage servers, using, for example, a Unix or Linux based operating system such as the Avaya Modular Messaging server. The voice data represents messaging, formats such as voice mail, voice over IP, paging components, facsimile, and network data, and in some cases may be received in binary format. The data access protocols used to request and receive the voice data include open database connectivity (ODBC), internet protocols (TCP/IP, HTTP), file transfer protocol (FTP), telnet, XModem, lightweight directory access protocol (LDAP), Win32 API protocol, and Kermit.

In some embodiments, the voice data transformation rules are selectively applied by analyzing a segment of data contained in the received voice data to identify an event represented by the segment of data and selecting an algorithm (e.g., data abstraction, data aggregation, data concatenation, data formatting, etc.) to apply to the segment of data to transform the data into an alternate segment of data. The transformed data can be stored in a composite data source, and queries can be received relating to performance metrics and/or usage metrics of the messaging data sources represented by the composite data source.

In another aspect, the present invention provides a system for creating a composite data source having a common data representation from disparate sources of voice data. A data aggregation server includes data collection objects, each object exposing at least one data retrieval method such that connectivity is established with each one of a group of heterogeneous messaging data sources thus facilitating the receipt of voice data from the messaging data sources. The server also includes a memory for storing the received data and a set of voice data transformation rules, and a transformation engine for retrieving the stored data and data transformation rules from the memory and selectively applying the rules to the received data to create a common data representation of the disparate sources of voice data.

In some embodiments, the system also includes an expert engine that analyzes a segment of data contained in the voice data to identify an event represented by the segment of data, and selects an algorithm to apply to the segment of data to transform the data into an alternate segment of data. The algorithm can be one or more of a data abstraction algorithm, a data aggregation algorithm, a data concatenation algorithm, and a data formatting algorithm. The system may include a data storage module for storing the alternate segment of data in a composite data source, a reporting module for providing reports related to performance and usage metrics of the messaging data sources, and a user interface for producing a graphical representation of the composite data source.

In yet another aspect, the invention provides an apparatus for monitoring voice data infrastructure that includes a data store for storing voice data retrieved from heterogeneous messaging data sources, a user-interface for producing a graphical representation of information relating to the contents of the data store, and an expert engine for selectively applying a set of transformation rules to the voice data thereby creating a common data representation of the messaging data sources.

In another aspect, the invention provides a user-interface for displaying information relating to the operational aspects of voice data equipment that includes at least one display window, each window containing a list of active links, which when activated, display information relating to the operational aspects of a piece of voice data equipment.

The voice data equipment can be a voicemail server (e.g., Avaya Modular Messaging), a voice over IP communications server, a paging server, a facsimile server, or an OctTelnet server. The operational aspects of the voice data equipment may be user-based statistics, time-based statistics, port-based statistics, geographic-based statistics, quality of service statistics, and/or server-based statistics. In some embodiments, at least one display window is displayed in a ticker display.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which.

In the drawings, like reference characters generally refer to corresponding parts throughout the different views. The drawings are not necessarily to scale, with emphasis instead being placed, on the principles and concepts of the invention.

DETAILED DESCRIPTION OF THE INVENTION

In brief overview, the present invention relates to methods and apparatus for creating and using a common data representation of a voice call and messaging domain built from voice system and messaging data gathered from numerous heterogeneous data sources using multiple data access protocols. By creating a common data model and storing the otherwise heterogeneous data in a composite data source, the data can be aggregated, organized, and viewed in various ways, depending upon the particular operational and usage metrics of interest at any given time.

Although these general concepts may be applied to many types of information, and in diverse fields, the descriptions herein are directed to information associated with voice data including, but not limited to voicemail data, voice routing data, facsimile data, paging data, voice over IP (VOIP) data, and the associated log data, audit data, alarms, and system and application level data generated by the systems that process such data. Because of the scale, complexity, and diversity of voice messaging systems deployed within large organizations, attempting to use the data from the various sources in a consistent and measured way can be difficult. Furthermore, the dimensions and levels that users often need to view the data for operational monitoring or other purposes (such as by user, by time period, by server, by port, etc.) may not coincide with how one or more of the data sources store or track the data at the system or application level. Embodiments of the present invention therefore retrieve the data in its raw form however stored, transform the data in to a common data format, and apply structure to the data, presenting it in a common data representation across the entire messaging and voice domain. Further provided is a graphical user-interface to allow users to monitor the operational aspects of the various sources of voice data using the common data model.

Figure 1:
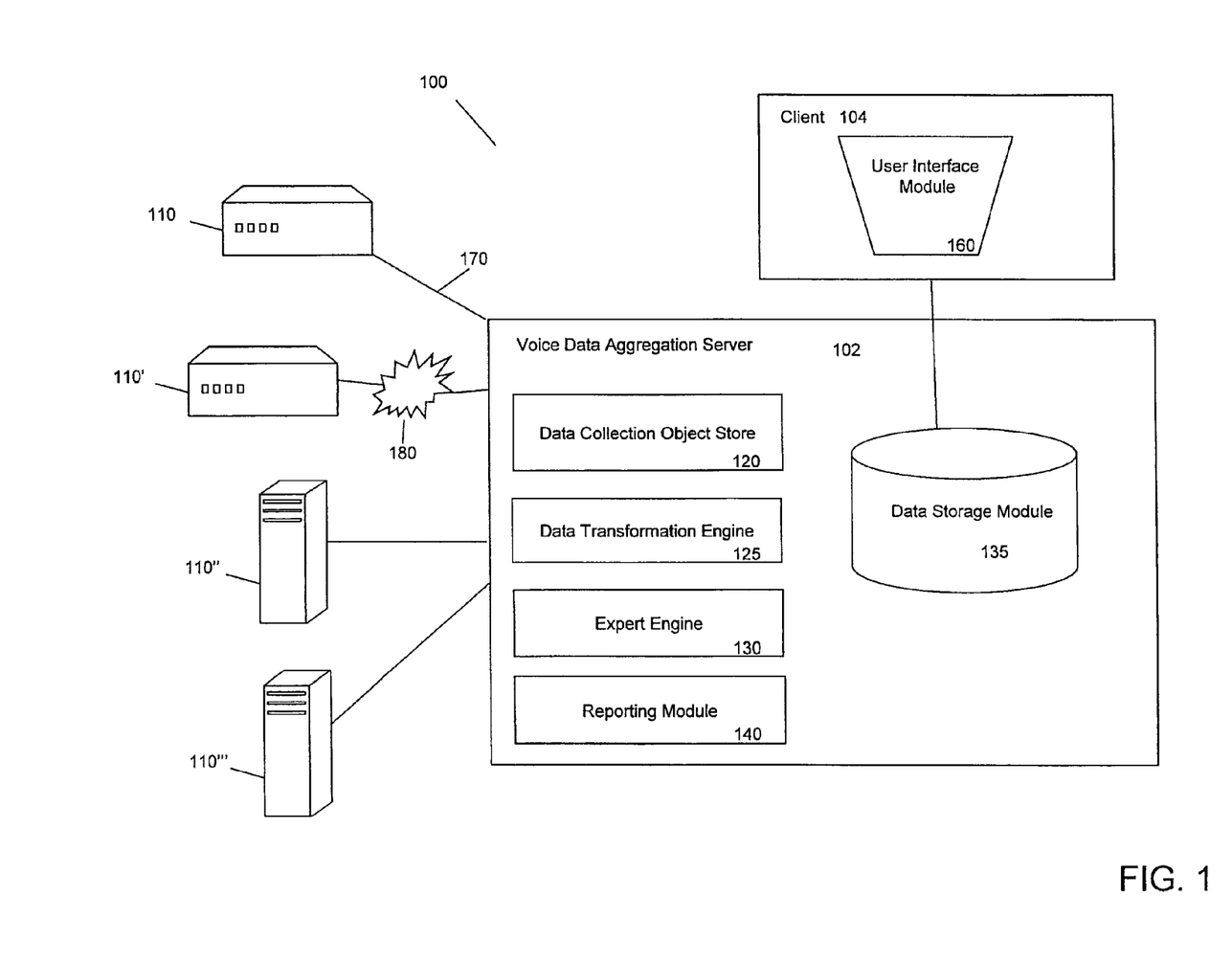
FIG. 1 depicts a block diagram of the voice data retrieval and processing system according to one embodiment of the present invention.

Referring to FIG. 1, in one embodiment, a voice data aggregation system 100 includes at least one voice data aggregation server 102, at least one client 104, and a series of data source servers 110. As shown, the voice data aggregation system 100 includes four data source servers 110, 110', 110'', and 110''' but this is only for exemplary purposes, and it is intended that there can be any number of data source servers 110 of various makes and models, each potentially having unique data storage and formatting standards for the data they generate. The data source servers 110 may be situated in a computer network, stored on network equipment such as computers, servers, hubs, TDM PBX's, routers, switches, and accessible through network communication mechanisms such as remote procedure calls (RPC), TCP/IP and/or XModem. The data source servers 110 may also be one or more databases or software applications which in some embodiments may be co-located with the other hardware and/or software components of the system 100. The data source servers 110 typically manage, monitor and store voice and messaging transactions that occur among system users, external entities, other systems and applications, and other data source servers 110 throughout the system 100.

Each data source server 110 may be connected to each other, the entire messaging platform, or other enterprise-wide components through a local area network 170, a wide area network (e.g., the Internet) 180, or both. The communication may take place via any media such as standard telephone lines, LAN or WAN links (e.g., T1, T3, 56 kb, X.25), broadband connections (ISDN, Frame Relay, ATM), wireless links, and so on. Preferably, the network 170, 180 can carry TCP/IP protocol communications, FTP requests, KERMIT requests, XModem requests, and HTTP/HTTPS requests made by the voice data aggregation server 102 and the connection between the software components resident thereon, and voice and messaging data can be requested and transmitted between the data source servers 110 and the voice data aggregation server 102. The type of network is not limited, however, and any suitable network may be used.

The voice data aggregation server 102 includes data retrieval components (which, in some embodiments are implemented through software using programming languages such as C#, C++, JAVA, and the like) that facilitate the retrieval, transformation and normalization of data from the data source servers 110. In one embodiment, the voice data aggregation server 102 includes a data collection object store 120 for storing and managing the exposure of the various data retrieval components, a data transformation engine 125 for retrieving and applying voice data transformation rules to the retrieved data, and an expert engine 130 for determining, among the transformed voice data, those data elements that represent known events (calls, messages, and the like) and can therefore can be associated with each other and aggregated into a common data representation. In some embodiments the voice data aggregation server 102 also includes a data storage module 135 for storing the transformed data for subsequent distribution and use. Non-limiting examples of applications that can perform the functions of the data storage module 135 include the Microsoft SQLServer Database Server offered by MICROSOFT of Redmond, Wash., the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif. In some embodiments, the voice data aggregation server 102 also includes a reporting module 140 that facilitates structured reporting and analysis of the data in the common data representation, one example of which is Crystal Reports by BusinessObjects, Inc. of San Jose, Calif.

The voice data aggregation server 102 is preferably implemented on one or more server class computers that have sufficient memory, data storage, and processing power and that run a server class operating system (e.g., SUN SOLARIS, GNU/LINUX, MICROSOFT WINDOWS or other operating systems). System hardware and software other than those described herein may also be used, depending on the capacity of the device, the number of users, and the amount of data and frequency with which it is received. For example, the voice data aggregation server 102 may be part of a server farm or server network, which is a logical group of one or more servers. As another example, there could be multiple voice data aggregation servers 102 that may be associated or connected with each other, or multiple servers could operate independently, but with shared data as retrieved from, for example, the data storage module 135. As is typical in large-scale systems, the application software that manages the data retrieval and transformation aspects of the invention may be implemented in components, with different components running on different server computers, on the same server, or some combination.

The client 104 is preferably implemented as software running on a computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SOLARIS from Sun Microsystems, and LINUX from Red Hat, Inc. of Durham, N.C. (and others). The client 104 could also be implemented on such hardware as a smart or dumb terminal, network computer, personal data assistant, wireless device, information appliance, workstation, minicomputer, mainframe computer, or other computing device that is operated as a general purpose computer or a special purpose hardware device solely used for serving as a client 104 in the voice data aggregation system 100.

In some embodiments, the client 104 also includes a user interface module 160. Generally, the clients 104 are operated by users of the system to receive, review, store and retrieve data regarding operational aspects of the data source servers 110. In various embodiments, the client computer 104 includes client applications and/or client software (not shown). Examples of client applications include Microsoft VisualBasic applications and web browser applications that allow the client 104 to perform various tasks on the client 104, including requesting a web page (e.g. from the voice data aggregation server 102) with a web page request or requesting data from a local or remote database using and ODBC data request and populating client-based dataforms. An example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 104 manually requests a web page from the server 102. Alternatively, the client 104 automatically makes requests with the web browser. Examples of commercially available web browser software are INTERNET EXPLORER, offered by Microsoft Corporation of Redmond, Wash., FIREFOX, offered by The Mozilla Foundation of Mountain View, Calif., and NETSCAPE NAVIGATOR, offered by AOL/Time Warner of Mountain View, Calif.

Figure 2:
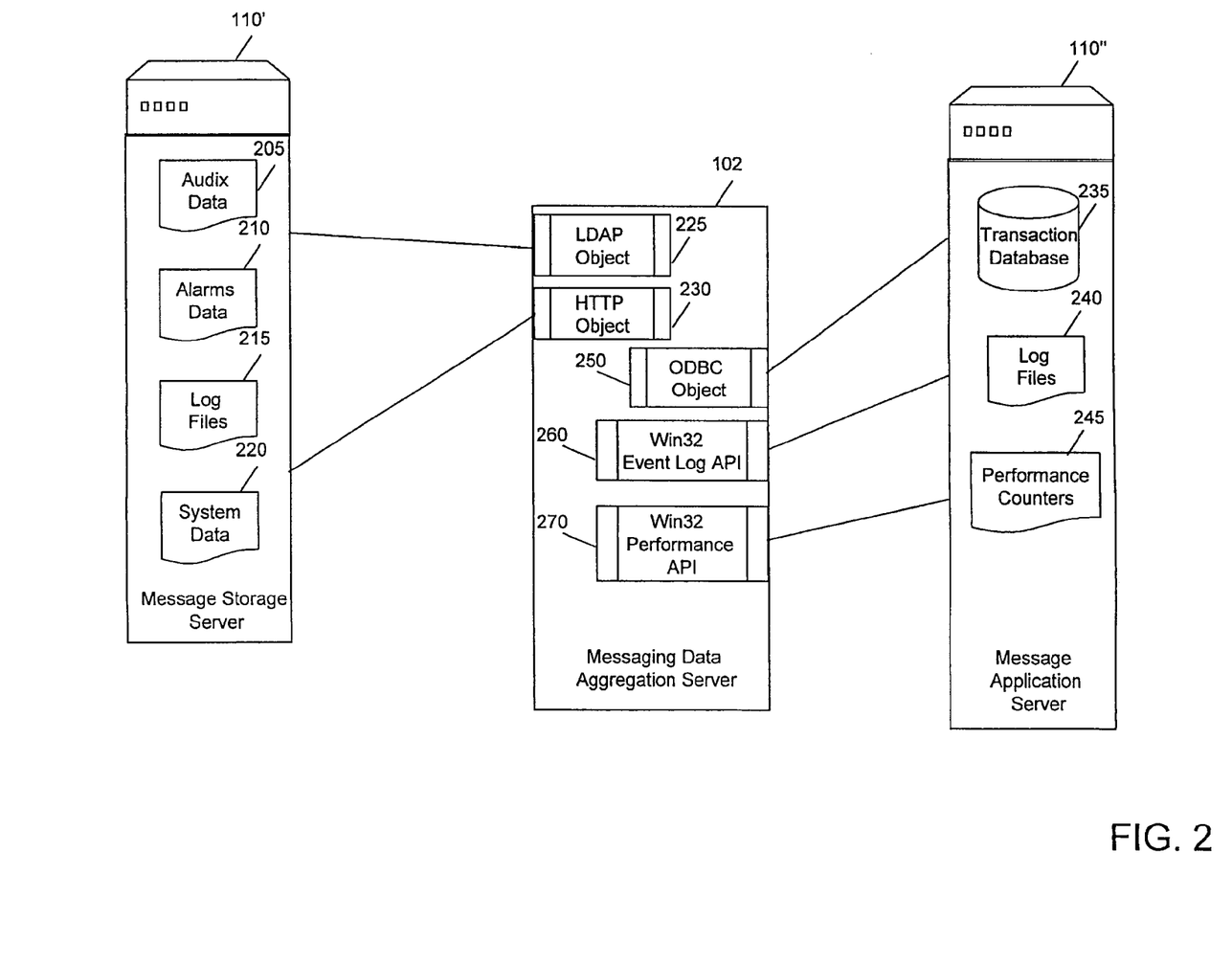
FIG. 2 illustrates a more detailed embodiment of the data collection components of FIG. 2.

Referring now to FIG. 2, the data source servers 110 of the present invention each perform a particular task or series of tasks within the system 100 such as processing incoming and outgoing voice calls, managing storage, delivery and login of voicemail systems, retrieval and storage of facsimile and paging data, and other message processing and delivery functions such voice over IP (VOIP), Octelnet, message delivery, etc. The data source servers 110 generally contain discrete data files that contain specific data elements, and generally, those data elements are associated with individual events regarding the performance and operation of the individual data source servers 110 within the system 100. Additionally, the data also may define the type of equipment being used as the data source server 110 and in some cases the data may be grouped into "sets," including a single data element or, alternately, more than one element.

The data source servers 110 generally include equipment from different vendors and manufacturers, which further complicates management oversight and reporting on the operational aspects of the system 100 as a single voice messaging domain. For example, the data source servers 110 can include both Unix-based message storage servers which are commonly used to store and monitor data relating to voice-mail and Audix systems, as well as Windows-based message application servers, which are commonly used to capture messaging traffic for internal applications such as facsimile routing, email, and the like. These messaging data sources provide, for example, data describing operating system events such as soft reboots, and memory flushes, hardware events such as power cycling and component swaps, application usage, hardware configuration, software configuration, as well as others. Furthermore, because of the inherent variations in formats and definitions of the various datasets, enterprise-wide reporting and monitoring becomes difficult, as users of the data require an "apples-to-apples" comparison of data across the entire voice system 100.

The functions of the voice data aggregation server 100 of the present invention address these issues by facilitating the retrieval, normalization, and storage of such heterogeneous data such that domain-wide analysis and reporting becomes meaningful and useful at the enterprise level. For example, the message storage servers 110 may contain certain datasets that are generated by the operating system resident on the data source server, whereas in some instances data may be generated by the messaging applications residing on the servers. Some of the datasets may be stored, for example, in flat files, whereas others may be stored in one or more relational databases residing on the data source servers 110. In some instances, each type of dataset necessitates a different communications protocol to access and retrieve the data, as well as distinct processing rules to facilitate inclusion into the common data model at the voice data aggregation server 102. For example, datasets representing telephone messages 205 and system-performance alarm datasets 210 may reside on an Unix-based Audix system (such as an Avaya Modular Messaging message storage server). These datasets may be stored using, as one example, a hierarchical, folder-based system that is accessed using the lightweight directory access protocol (LDAP) by exposing an LDAP object 225 from the data collection object store 120 on the voice data aggregation server 102. The exposed LDAP object 225 creates appropriately formatted LDAP requests and transmits the requests to appropriate location(s) in the message data storage server(s) 110 which in turn process the requests and provide the requested data. In one exemplary example, the voice data aggregation server 110 recognizes a request for one or more datasets stored on a messaging data source using LDAP and creates an instance of the LDAP object-oriented class built using, for example, an implementation of the LDAP application programming interface (API).

In some embodiments, other datasets such as application log data 215 and operating system performance data 220 may be stored in binary data format files at particular HTTP addresses on one or more data source servers 110. To access this data, an extensible object-class 230 is created using the Microsoft WinINetAPI and stored in the data collection object store 120, and, when instantiated, uses the hypertext transfer protocol (HTTP) to connect to appropriate location (s) of the data source servers 110. A script file is then run against the retrieved data to transform the binary data into record style data and assign unique identifiers to each record for inclusion into the common data representation, aggregation and reporting.

In other instances, data can reside in one or more ODBC compliant databases 235 on one or more data source servers 110. To extract the voice data from the ODBC data sources, an extensible object-class 250 is created using the Microsoft ODBC driver, and connections are established to the appropriate data source servers 110. The data is received, converted into record style data, and each record is assigned a proprietary unique identifier, including data source, date and timestamp information. Once the data has been converted and stored in record format with the appropriate unique identifiers assigned, the data can then be accessed using standard Microsoft SQL Server ODBC drivers and aggregated into the appropriate voice, fax, paging, and Octelnet data buckets within the common data representation.

In some embodiments, where voice and/or messaging applications are operating under the Windows operating system, Windows-based application event log data 240 is stored in the application log files residing on one or more data source servers 110, and can be accessed via the Win32EventLog API 260. An extensible object-class is used to read the binary event log data 240 and convert the data into a record-style format for analysis and aggregation. The data is encoded with source identifiers depending on the source of the messaging data, and in some embodiments combined with vendor information to allow for vendor-level reporting at the system and application level.

In some instances, it may be desirable to monitor and review server-level performance data 245, and for those messaging data sources running a Windows-based operating system, the Microsoft Performance Data Helper API 270 is used to extract performance data in, for example, binary format, convert the binary data to record format, and assign unique source and date/timestamp information. Other examples of data request and retrieval protocols used to access datasets on data source servers 110 include XModem, Kermit, and FTP.

Data Retrieval and Transformation Process

Figure 3A:
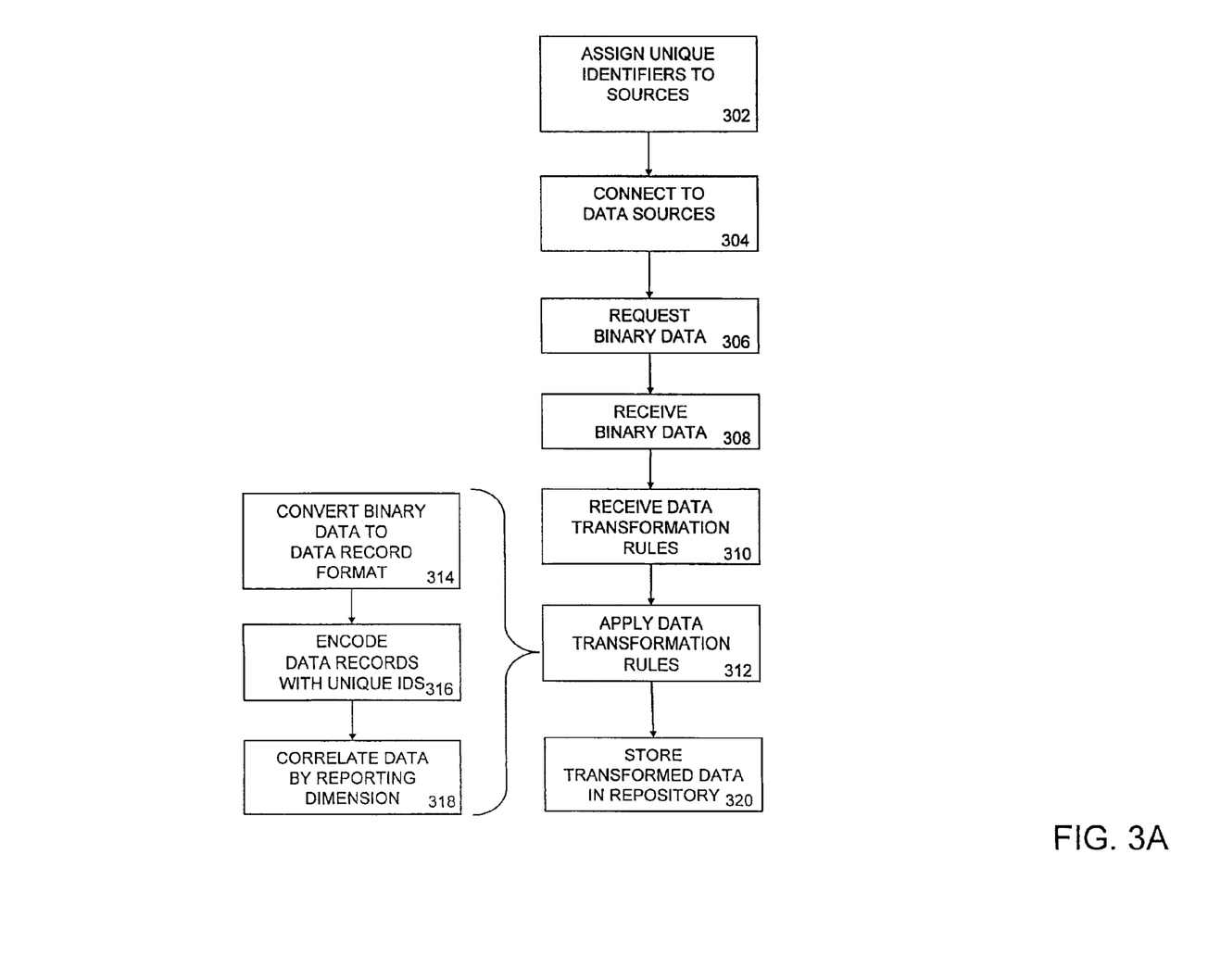
FIG. 3A depicts a flow chart of data capture and transformation in accord with one embodiment of the invention.
Figure 3B:
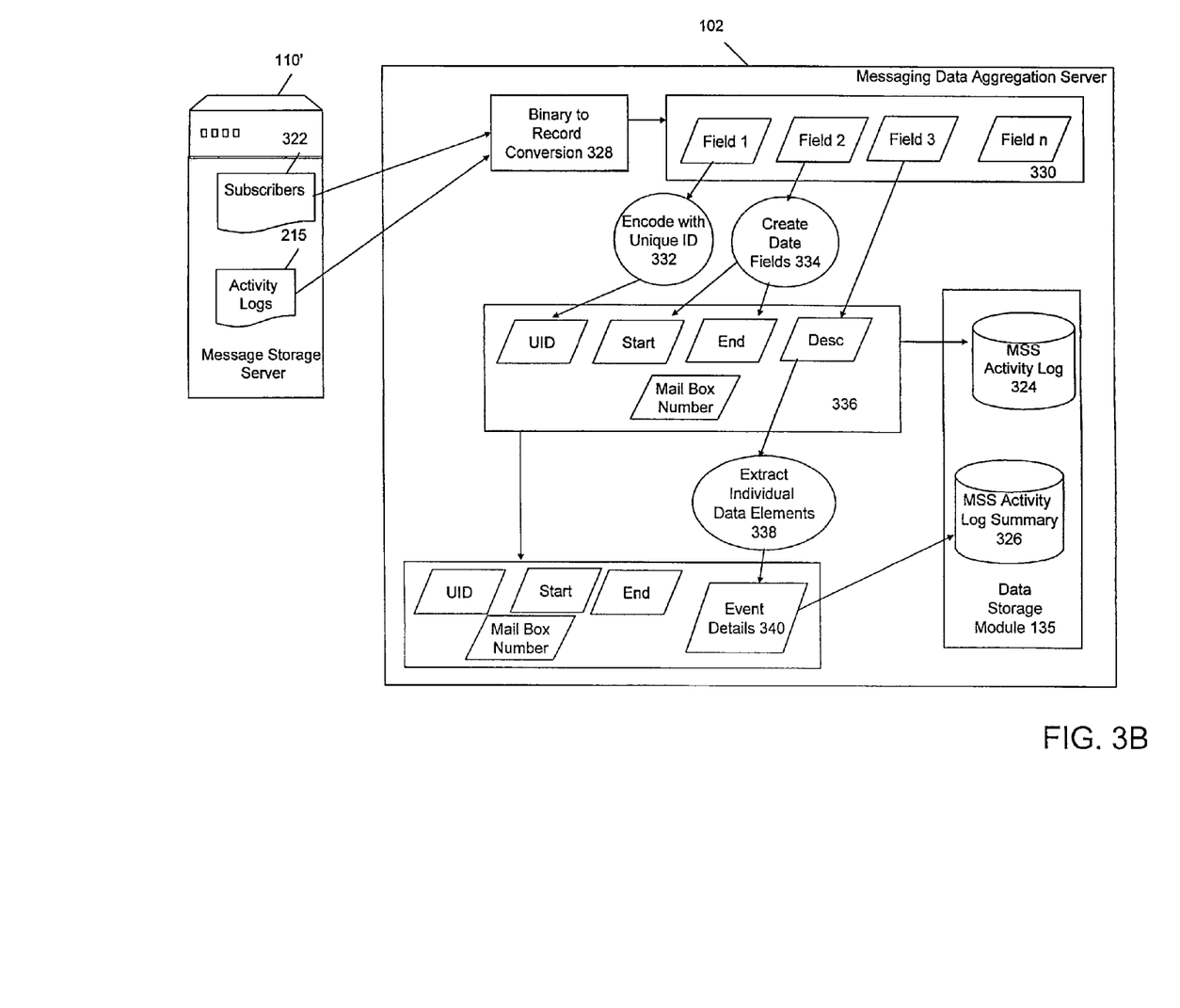
FIG. 3B depicts a more detailed embodiment of the data transformation process of FIG. 3A.

Referring to FIGS. 3A and 3B, methods for requesting, retrieving, and transforming voice data are illustrated. Initially, the voice data aggregation server assigns unique identifiers (STEP 302) to each of the data source servers from which it will request data. The unique identifiers are used to identify the source of the data once it is aggregated into a common data representation of the entire voice domain and stored in the data storage module. The data aggregation server also creates a domain level identifier by assigning associative identifiers that associate each messaging data source with the other messaging data sources within its domain. Using the unique identifiers, the voice data aggregation server executes one or more function calls that expose the various object classes described above (LDAP, ODBC, WIN32API's, Kermit, FTP, XModem, etc.) to establish data connectivity (STEP 304) with the appropriate data source servers. With connectivity established, the raw binary data is requested (STEP 306) from each of the data sources. The binary data is received (STEP 308) at the voice data aggregation server, and a set of data transformation rules are retrieved from either local or remote memory (STEP 310) and applied to the binary data (STEP 312).

More specifically, the received binary data is first converted to record-style data (STEP 314) such that individual transactions (calls, messages, faxes, pages, etc.) can be uniquely identified by source, date/time, and transaction type (STEP 316). For example, FIG. 3A illustrates the conversion and transformation process performed by the expert engine to transform the message storage server "activity log" data object 215 into human readable activity log data 324 and summary activity log data 326 such that the data can be stored in the data storage module 135 of the voice data aggregation server 102. The expert engine module collects the subscribers data object 322 from the message storage server 110'. Using the subscriber data 322 it collects the message storage server activity log data object 215 for each subscriber. The system converts the information 320 from its raw binary format into a record style format 330 based on, for example, fixed delimiters inherent to the binary format, as well as the content and other marker information found in the binary format. The record style data 330 is then combined with a unique id 332 to create a unique data record for each event.

The sources of messaging and voice data may have a core set of common data elements associated with them, however many of the data sources will also include data fields that are unique to a particular type of message or to the specific manufacturer of the piece of hardware or developer of software components. For example, facsimile data will generally include a "page count" field for each facsimile data record, whereas voicemail records will generally include a "call duration" field. Furthermore, different fax systems may store "page count" data in different locations, using different data formats (Hex, ASCII, binary, etc.) The expert engine then analyses the converted data on, for example, a row-by-row, basis to determine the specific attributes and patterns in the data of interest based on the source and type of data being processed.

The expert engine scans each data element of the received data and, by comparing the scanned data to a known set of data formats, selectively applies the set of data transformation rules (e.g., different rules are applied depending on the source and format of the received voice data) and data entities are created for particular metrics and operational statistics by correlating various data records by one or more reporting dimensions (STEP 318). The set of rules transforms the data from its native format into a common data representation. In some embodiments, the transformation may be a one-to-one mapping, whereas in some instances data manipulation processes such as date creation 334, concatenation, aggregation, and others are needed to create the data elements of the common data representation. As an example, the expert engine may further processes certain records from the activity log data 324 such as those that contain unique markers such as "activity type" equal to "inbox-stat" and "activity type" equal to "status." For these records, the data object "Desc" can be broken down 338 into its constituent parts based on markers contained in the information. Examples of even detail data elements 340 include new message indicators, deleted flags, unopened flans, and the like. These records may then be mapped into the message storage server activity log summary data repository 326 in the data storage module 135.

For example, the hour user traffic metrics catalog individual users' traffic within the domain on an hourly basis. Multiple and separate event entries are retrieved from one or more data source servers using one or more of the protocols described above, analyzed according to the attributes such as call type and call outcome, and aggregated by mailbox, originating server, call media type, transaction type, transaction sub-type, and outcome. The voice data aggregation server receives the binary data from the data source servers, processes the data into meaningful buckets that classify summations of event counts and time durations of significant events for a mailbox, and stores the data storage module with unique identifiers. Similar process are used to capture, identify and store usage and performance metrics such as hour system traffic metrics, hour port traffic metrics, ports busy metrics, server based metrics, attendant metrics, as well as others. Other time-based metrics can subsequently be calculated at the day, week and/or month level for users, servers and ports based on the hourly usage metrics.

Other examples of data fields that are created and stored in the common data format include disk utilization metrics, CPU utilization, total incoming and outgoing message minutes, peg unit counts, as well as others. Because each individual piece of voice data hardware potentially stores these data elements in different locations and using different formatting options, the rules for transforming the raw, binary data into a usable common data representation differ across the system. For example, calculating the "Number of Users" for the Avaya Intuity voice mail systems requires connecting to the data source server using the Kermit protocol to download a local subscriber dataset. The local dataset is then processed and individual usage records are stored in a temporary table. The temporary table is scanned for valid records, and unique user id's are counted. The result is placed in the "Number of Users" field in the common data representation. The transformed data may then be stored in one or more databases (STEP 320) for retrieval and reporting purposes.

Similar parsing and scanning operations may be used to calculate metrics from Avaya Octel 250 and 350 voice mail systems, Nortel Meridian PBX systems, Avaya S8700 Communication Manager Servers, Avaya Interchange Hubs, Captaris RightFax Servers, Avaya Modular Messaging Servers, Avaya Intuity messaging servers, Cisco/Latitude Audio Conferencing Systems, Avaya Definity G3 Systems, and Avaya Octel O200-300 voice mail servers.

User Interface

The user-interface of the present invention presents data from numerous messaging data sources throughout a voice messaging network to enable a user to easily identify the presence of a problem in the domain. For example, when the invention reports that some voice ports are overloaded, it is useful to know which ports are affected, and which areas of the domain are impacted by the overload.

Figure 4:
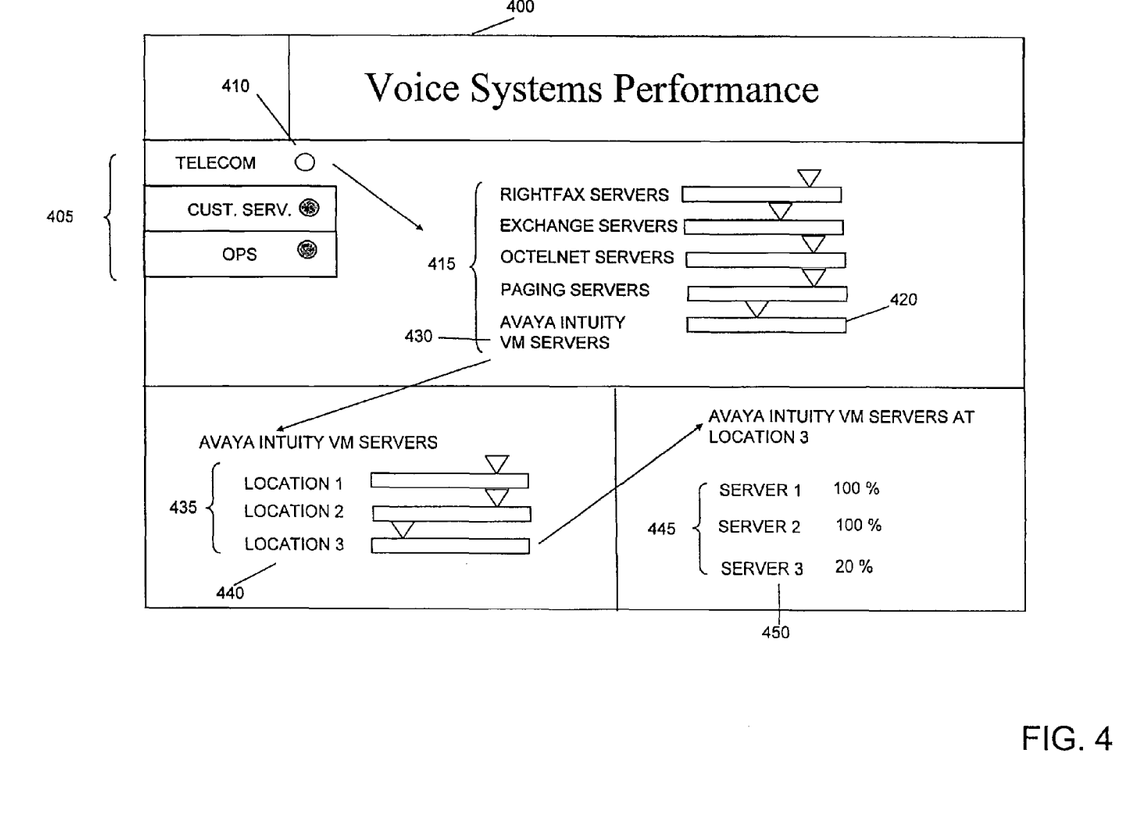
FIG. 4 depicts a representative screen-capture in accord with one embodiment of the invention.

FIG. 4 depicts a user-interface comprising a graphical display of the voice data generated according to an embodiment of the invention. In one embodiment of the present invention, the voice data is displayed substantially as it is generated on, e.g., the user interface module 160, and the user interface module 160 receives substantially constant updates from the composite data source. In other embodiments, the voice data display may be generated on a periodic basis (e.g., daily, or hourly) using, for example, a stored procedure or "cron" job to initiate the data retrieval process. In some cases; the data is generated using a "pull" approach such that the data remains static until a user selects a particular link or data element on the display, at which point the system initiates the data retrieval and transformation process. The particular form of the displayed structure may, for example, take the form of graphical user interface ("GUI") 400. The GUI 400 depicts three dimensions of performance data 405—i.e., telecom (voice), customer service, and operations (ops). For each data dimension, a performance indicator 410 indicates whether data anomalies or performance issues within that domain such that an "alarm-state" exists. For example, a dark indicator, as shown for customer service and operations may indicate normal performance, whereas a light indicator 410 may indicate sub-optimal or sub-standard performance. In some embodiments, the point at which the indicators change from a "normal state" to an "alarm state" may be based on previously determined service level agreements as established by the operators, vendors, customers, or some combination thereof.

When a user is presented with an alarm state, they can manually select (or in some cases the system will automatically present) more detailed information—e.g., the system will "drill-down" and retrieve performance metrics for the various systems that comprise the domain that is under performing. In the example shown in FIG. 4, selecting the telecom link further provides a listing 415 of the various server groupings that comprise the telecom domain. In this example, the listing of servers includes fax servers, exchange servers, Octelnet servers, paging servers, and Avaya Intuitiy voicemail servers 430, which in this case are shown as underperforming based on the indicator 420. This indicator, may, in some instances, represent multiple physical pieces of equipment located throughout the domain. As illustrated, the GUI 400 is also capable of displaying alarm states originating from particular messaging data sources associated with various elements in the domain. The alarm state indicator 420 can be displayed adjacent to an element in the display 405, alerting a viewer that the equipment associated with that element is alarmed and that the particular element may be selected for drill-down reporting and potentially obtain more information about the source of the alarm. Other alarm states may alert a viewer when a particular piece of voice equipment is not operating or operating in a suboptimal manner; and conversely, an appropriately colored alarm state indicator, e.g., a green light, may be used to indicate that the absence of alarm condition. In some instances, the link itself may be presented in a particular color, as a flashing link, or other presentation mode designed to draw attention to the link.

In the example of FIG. 4, the Avaya Intuitiy Voicemail Servers 430 indicate poor performance, and selecting link 430 provides a listing 435 of the various locations of the Avaya Intuitiy voicemail servers 430, with similar performance metrics for each location. Identifying a particular location (in this case, Location 3 440) that is underperforming allows the user to further expand the data and eventually arrive at a listing of individual physical servers 445 and identify the offending equipment 450, thereby allowing a user to drill-down into the data and be presented with increasingly detailed views on multiple display windows. Because, in many cases, the listing of data source servers includes equipment from various vendors, and each server may store data in unique formats, the previously described systems and methods for capturing, transforming, and storing the data in a common data representation are particularly useful in providing this easy to use graphical interface.

As discussed, alarm states may be presented at any level or for any individual messaging data source within the common data representation of the entire domain. For example, they may be displayed at the level which they originate (e.g., at a particular server), but in a deep or broad hierarchical structure, it may be useful to propagate alarm states and alarm state indicators up the hierarchy to facilitate analysis and review. For example, a problem with a particular voicemail server would cause an alarm state to be triggered and displayed adjacent to the server causing the alarm, and may also be displayed as an alarm state at a higher level of a hierarchy— e.g., geographic, functional, organizational, etc.

In the display 400, the text in each of the display windows represents elements within the common data representation of the present invention, based on, for example, geographic location of the data source servers. The partial definition of the common data structure may be provided manually, through automatic discovery, or by import from other sources like network management or mapping software. In one embodiment of the present invention, a display of an automatically generated common data representation also includes the number of users affected by certain events or an estimate of cost associated with the number of users affected by certain events, such as server failures, mailbox overflows, and the like. If, for example, a user requested information about a component of the domain that was experiencing an alarm state and impacting a large cross-section of the organization by selecting the displayed alarm state indicator 410 with a mouse or touchpad, the request would traverse the common data representation and would result in automatically displaying more detailed levels 415 and 435.

Ticker-Format Display

The display system described above can be used to provide status information in an accessible format that conveys substantial amounts of information while allowing users to continue use the client for other activities. As such, the present invention also provides an improved display for the common data representation described above that is smaller than a multi-display user-interface. One embodiment of this display takes performance metric data at a particular level of granularity and horizontally scrolls the data across a computer desktop from, for example, left to right in a narrow band. The width of the band can be approximately 10 percent of the vertical dimension of the desktop, although narrower and wider bands may be used depending upon the desktop space the user allocates to the display. In one embodiment, the ticker is a computer program written in JavaScript or ActiveX language, and may be provided over a network to multiple clients.

Figure 5:
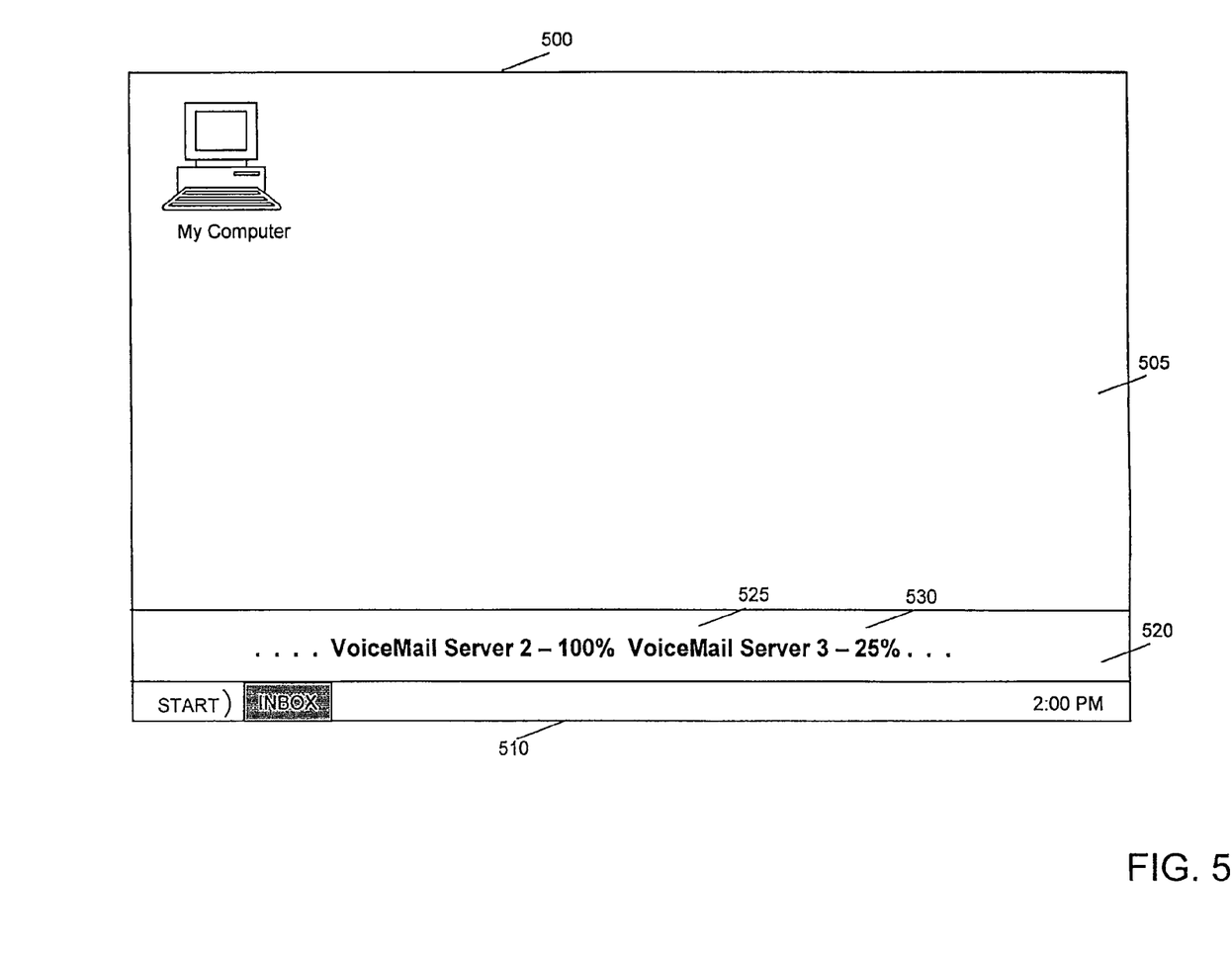
FIG. 5 depicts a representative screen-capture including a ticker display in accord with one embodiment of the invention.

In one embodiment, referring to FIG. 5, a client desktop display 500 includes display areas such as a desktop 505, a toolbar 520, as well as a ticker 520 in accordance with the invention that displays performance data extracted from the common data representation of the voice domain. Information from the common data representation is scrolled horizontally across the window displaying the ticker 520. A user may then observe that information as it scrolls across the desktop 505. A user desiring to view information at a more detailed level of the common data representation can select a particular element from, for example, the display of FIG. 4 and, in turn, information from the newly-selected display scrolls across the ticker 520. In general, the status ticker display 520 serially scrolls through all of the components within the selected subset of components, regardless of whether the status associated with the component is good or bad. In some embodiments, however, filters can be created such that only those components of the domain that are in alarm-state are shown.

All of the components from the selected level of the common data representation may be displayed serially from highest tier in the domain (enterprise-wide) to lower tiers in the domain (individual locations or pieces of equipment). Alternately, the ticker 520 may be configured such that only certain pre-selected components or messaging data sources are displayed in scrolling ticker format.

In another embodiment, the ticker display 520 contains selectable links 525, 530 that represent particular data elements within the common data representation. In response to a user selecting a link 525, the ticker displays detailed information about the element associated with the selected link drawn from the common data representation.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. The following claims are thus to be read as not only literally including what is set forth by the claims but also to include all equivalents that are insubstantially different, even though not identical in other respects to what is shown and described in the above illustrations.

What is claimed is:

1. A method for creating a composite data source having a common data representation from disparate sources of voice data, the method comprising:

establishing at least one data transmission link to each of a plurality of heterogeneous messaging data sources, wherein at least two of the heterogeneous messaging data sources have unique data storage and formatting standards for voice data associated therewith, wherein the voice data associated with at least one heterogeneous messaging data source from the plurality of heterogeneous messaging data sources includes operational data generated by an operating system resident on the at least one heterogeneous messaging data source, and at least one of call or message transaction data generated by one or more messaging applications residing on the at least one heterogeneous messaging data source;

transmitting, to the at least one heterogeneous messaging data source, a first request for the operational data over the at least one established data transmission link using a first data access protocol;

transmitting, to the at least one heterogeneous messaging data source, a second request for the at least one of call or message transaction data over the at least one established data transmission link using a second data access protocol, wherein the second data access protocol is different from the first data access protocol;

receiving voice data including the operational data and the at least one of call or message transaction data from the at least one heterogeneous messaging data source in response to the first transmitted request and the second transmitted request, wherein the operational data and the at least one of call or message transaction data is received in a binary format;

retrieving a set of stored voice data transformation rules;

selectively applying a first subset of the voice data transformation rules to the received operational data to transform the received operational data into a common data representation; and selectively applying a second subset of the voice data transformation rules to the received at least one of call or message transaction data to transform the received at least one of call or message transaction data into the common data representation, wherein the first subset of voice data transformation rules are distinct from the second subset of voice data transformation rules, and wherein the selective application of the first and second subset of voice data transformation rules is based at least in part on the heterogeneous messaging data source from which voice data is received and the format of the received voice data.

2. The method of claim 1, wherein the plurality of heterogeneous messaging data sources comprises one or more of a message application server and a message storage server.

3. The method of claim 1, wherein at least one of the plurality of heterogeneous messaging data sources utilizes a Unix-based operating system.

4. The method of claim 1, wherein at least one of the plurality of heterogeneous messaging data sources is an Avaya Modular Messaging voice messaging domain.

5. The method of claim 1, wherein the one or more messaging applications generate at least one of call or message transaction data including at least one voice messaging format selected from the group consisting of recorded voice mail, voice-over-IP, paging, facsimile, and OctTelnet.

6. The method of claim 1, wherein the received at least one call or message transaction is associated with one or more attributes that include a transaction type attribute and one or more of: a call type, a call outcome, call duration, mailbox identifier, message type, or page count.

7. The method of claim 1, wherein the first and second data access protocol are selected from the group consisting of open database connectivity, internet protocol, file transfer protocol, telnet, XModem, lightweight directory access protocol, hypertext transmission protocol, Win32 API protocol, and kermit.

8. A system for creating a composite data source having a common data representation from disparate sources of voice data comprising:
  a voice data aggregation server comprising;
    a plurality of data collection objects, each object exposing at least one data retrieval method such that connectivity is established with each of a plurality of heterogeneous messaging data sources and thereby facilitating the receipt of voice data from the heterogeneous messaging data sources at the server in a binary format, wherein at least two of the heterogeneous messaging data sources have unique data storage and formatting standards for voice data associated therewith, wherein the voice data associated with at least one heterogeneous messaging data source from the plurality of heterogeneous messaging data sources includes operational data generated by an operating system resident on the at least one heterogeneous messaging data source, and at least one of call or message transaction data generated by one or more messaging applications residing on the at least one heterogeneous messaging data source,
    a memory structure that stores the received voice data including the operational data and the at least one of call or message transaction data, and a set of voice data transformation rules relating to the received voice data, and
  a transformation engine that:
    retrieves the stored received voice data and the voice data transformation rules from the memory structure,
    selectively applies a first subset of the voice data transformation rules to the stored received operational data to transform the stored received operational data into a common data representation, and
    selectively applies a second subset of the voice data transformation rules to the stored received at least one of call or message transaction data to transform the stored received at least one of call or message transaction data into the common data representation,
    wherein the first subset of voice data transformation rules are distinct from the second subset of voice data transformation rules, and wherein the selective application of the first and second subset of the voice data transformation rules is based at least in part on the heterogeneous messaging data source from which the stored received voice data is received and the format of the stored receive voice data.

9. The system of claim 8, wherein the plurality of heterogeneous messaging data sources comprises one or more of a message application server and a message storage server.

10. The system of claim 8, wherein the at least one of the plurality of heterogeneous messaging data sources utilize a Unix-based operating system.

11. The system of claim 8, wherein at least one of the plurality of heterogeneous messaging data sources is an Avaya Modular Messaging voice messaging domain.

12. The system of claim 8, wherein the one or more messaging applications generate at least one of call or message transaction data including at least one voice messaging format selected from the group consisting of recorded voice mail, voice-over-IP, paging, facsimile, and OctTelnet.

13. The system of claim 8, wherein the received at least one of call or message transaction data associated with one or more attributes that include a transaction type attribute and one or more of: a call type, a call outcome, call duration, mailbox identifier, message type, or page count.

14. The system of claim 8, wherein the data collection objects utilize at least one protocol selected from the group consisting of open database connectivity protocol, internet protocol, file transfer protocol, telnet, XModem, lightweight directory access protocol, hypertext transmission protocol, Win32 API, and Kermit protocol.

15. A voice data infrastructure monitoring apparatus comprising:
  a data store that stores voice data retrieved from a plurality of heterogeneous messaging data sources, wherein at least two of the heterogeneous messaging data sources have a unique data storage and formatting standards for voice data associated therewith, wherein the voice data associated with at least one heterogeneous messaging data source from the plurality of heterogeneous messaging data sources includes operational data generated by an operating system resident on the at least one heterogeneous messaging data source, and at least one of call or message transaction data generated by one or more messaging applications residing on the at least one heterogeneous messaging data source, and wherein the voice data is retrieved in a binary format; and
  one or more processors configured to:
    provide a user-interface in communication with the data store for producing a graphical representation of information relating to the contents of the data store, and
    provide an expert engine in communication with the data store and user-interface that selectively applies a first set of voice data transformation rules to the retrieved operational data to transform the retrieved operational data to a common data representation, and selectively applies a second set of the voice data transformation rules to the retrieved at least one of call or message transaction data to transform the retrieved at least one of call or message transaction data into the common data representation, wherein the first set of voice data transformation rules are distinct from the second set of voice data transformation rules, and wherein the selective application of the first and second set of voice data transformation rules is based at least in part on the heterogeneous messaging data source from which the voice data is retrieved and the format of the retrieved voice data.

16. The voice data infrastructure monitoring apparatus of claim 15, wherein the user-interface displays information relating to the operational aspects of messaging data sources, the user-interface comprising:

at least one display window, each display window comprising a listing of active links associate with the plurality of heterogeneous messaging data sources, wherein each active link, when activated, displays information relating to the operational aspects of a corresponding messaging data source, based at least in part on the retrieved operational data and the retrieved at least one of call or message transaction data.

17. The voice data infrastructure monitoring apparatus of claim 15, wherein the messaging data source is selected from the group consisting of a recorded voice mail server, a voice-over-IP server, a paging server, a facsimile server, and an OctTelnet server.

18. The voice data infrastructure monitoring apparatus of claim 15, wherein the messaging data source is an Avaya Modular Messaging voice messaging domain.

19. The voice data infrastructure monitoring apparatus of claim 16, wherein the operational aspects of the messaging data source is selected from the group consisting of user-based usage statistics, time-based usage statistics, port-based usage statistics, geographic-based usage statistics, quality of service statistics, server-based usage statistics, and configuration data.

20. The voice data infrastructure monitoring apparatus of claim 16, wherein the at least one display window is displayed in a ticker display.

* * * * *